United States Patent [19]

Yamane et al.

[11] Patent Number: 5,764,404
[45] Date of Patent: Jun. 9, 1998

[54] WAVELENGTH-DIVISION-MULTIPLEXING OPTICAL AMPLIFIER

[75] Inventors: Kazuo Yamane; Michikazu Shima; Yumiko Kawasaki; Kenji Tagawa; Shinya Inagaki, all of Kawasaki; Norifumi Shukunami, Sapporo, all of Japan

[73] Assignee: Fujitsu Limited, Kanagawa, Japan

[21] Appl. No.: 508,471

[22] Filed: Jul. 28, 1995

[30] Foreign Application Priority Data

Sep. 26, 1994 [JP] Japan .................. 6-229164

[51] Int. Cl.$^6$ ............... H01S 3/16; H04B 10/12
[52] U.S. Cl. .......... 359/341; 359/124; 359/160; 359/127
[58] Field of Search ................. 359/115, 124, 359/160, 177, 179, 337, 341

[56] References Cited

U.S. PATENT DOCUMENTS

| | | | |
|---|---|---|---|
| 5,345,332 | 9/1994 | de Silva et al. | 359/341 |
| 5,392,154 | 2/1995 | Cheng et al. | 359/341 |
| 5,463,487 | 10/1995 | Epworth | 359/124 |
| 5,506,724 | 4/1996 | Shinuzu et al. | 359/341 |
| 5,510,926 | 4/1996 | Boyant et al. | 359/179 |
| 5,600,423 | 2/1997 | Hufer | 359/179 |

FOREIGN PATENT DOCUMENTS

| | | |
|---|---|---|
| 0 440 024 | 8/1991 | European Pat. Off. . |
| 0 508 149 | 10/1992 | European Pat. Off. . |
| 0 508 880 | 10/1992 | European Pat. Off. . |
| 0 617 527 | 9/1994 | European Pat. Off. . |
| 58-85588 | 5/1983 | Japan . |
| 4-10586 | 1/1992 | Japan . |
| 2 243 942 | 11/1991 | United Kingdom . |
| 2 257 320 | 1/1993 | United Kingdom . |
| 2 280 561 | 2/1995 | United Kingdom . |

*Primary Examiner*—Nelson Moskowitz
*Attorney, Agent, or Firm*—Helfgott & Karas, P.C.

[57] ABSTRACT

An optical amplifier amplifies a wavelength division-multiplexed optical input signal composed of optical signals having different wavelengths such that the output level of each of the optical signal is always optimized and such that the difference between the gains of the amplifier on the optical signals is minimized when the number of optical signals is two. The output level of the amplifier is controlled according to the number of the optical signals, to optimize the output level of each of the optical signals.

9 Claims, 19 Drawing Sheets

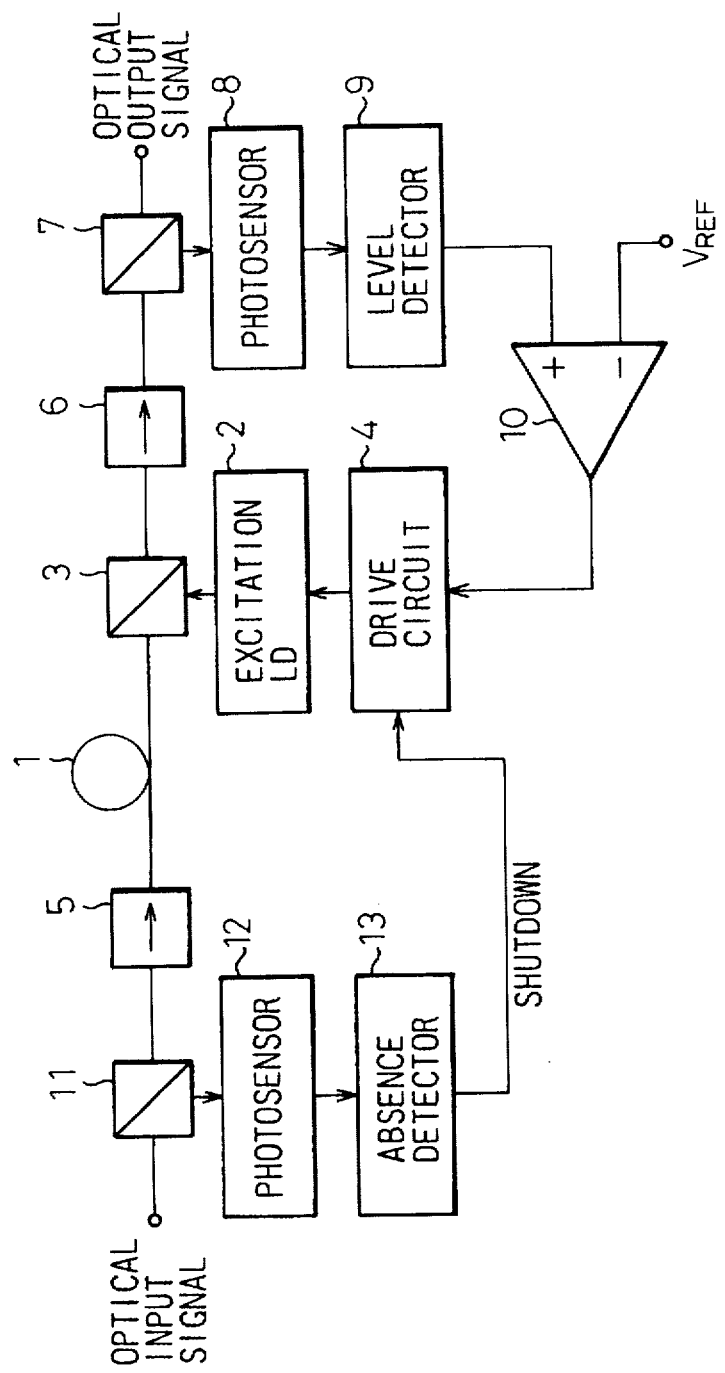

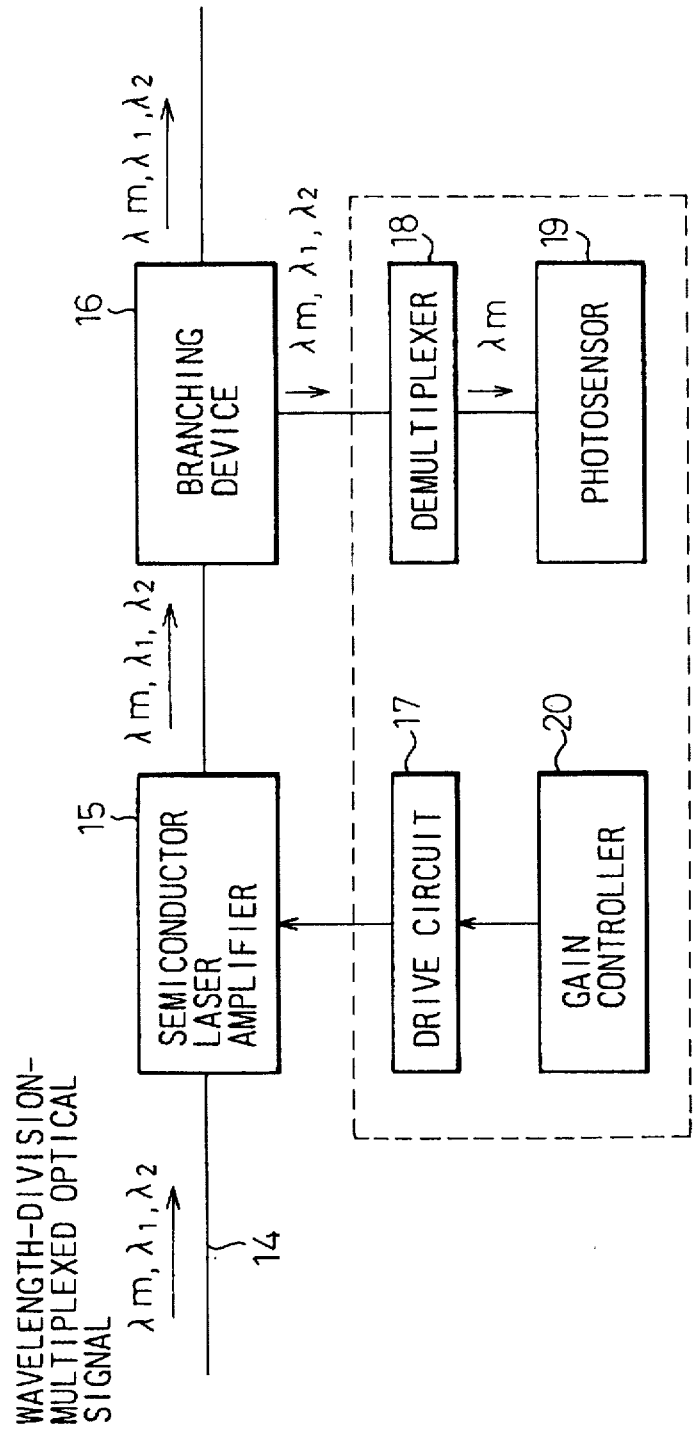

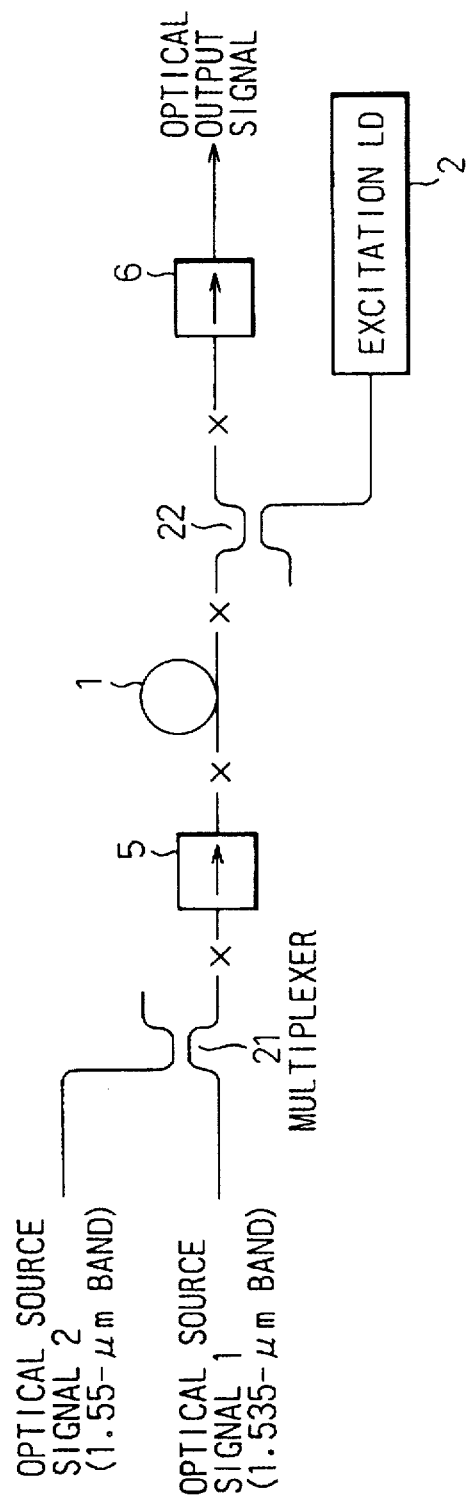

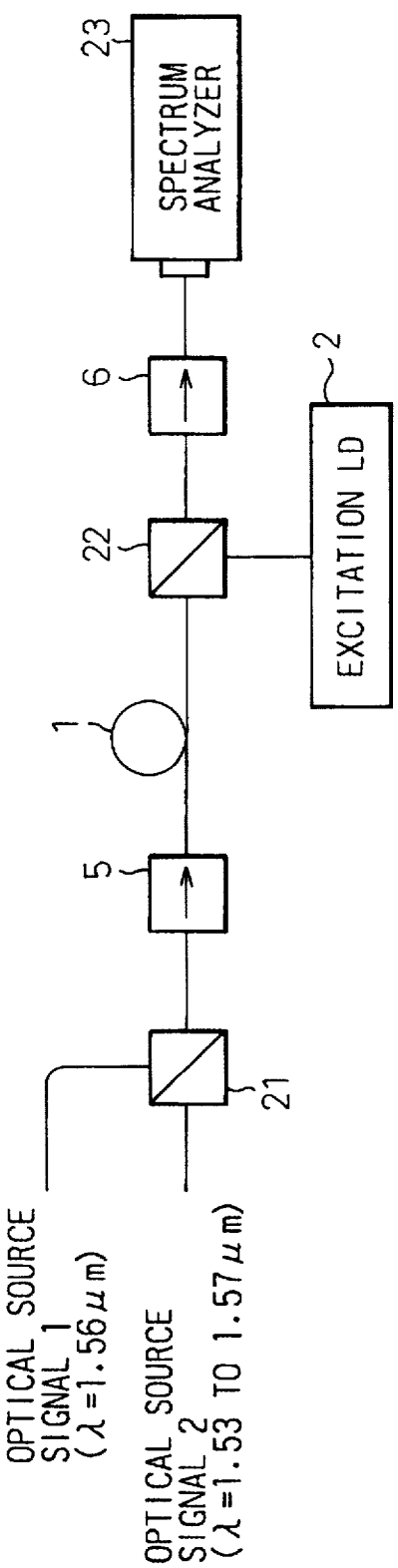

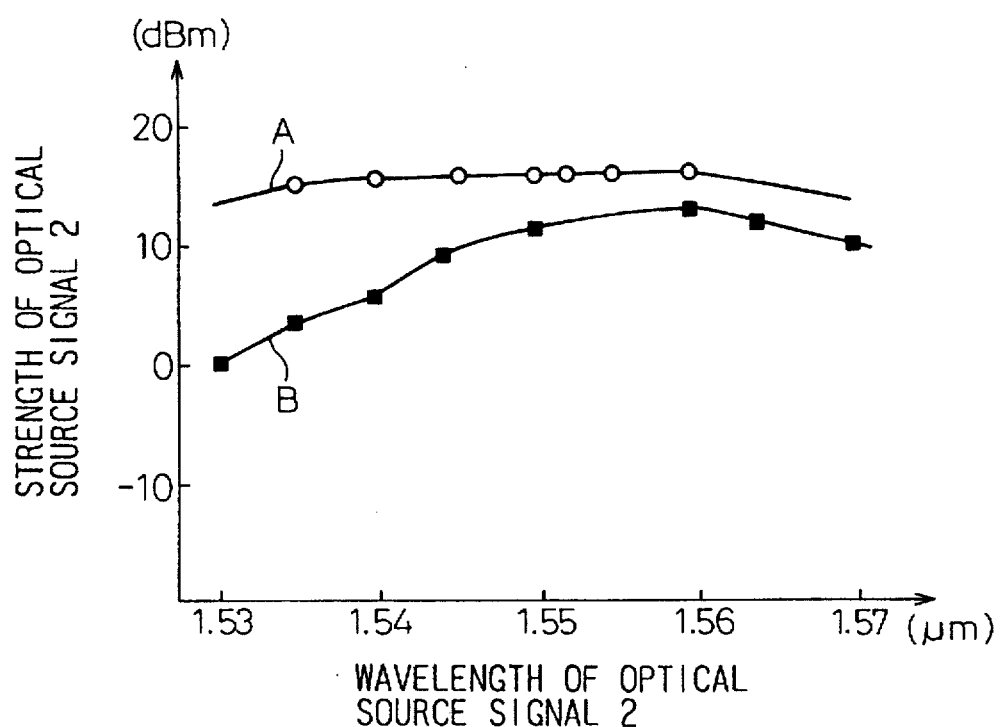

WAVELENGTH-DIVISION-MULTIPLEXING OPTICAL AMPLIFIER

BACKGROUND OF THE INVENTION

1. Field of the Invention

The present invention relates to a wavelength division-multiplexing (WDM) optical amplifier, and particularly, to an output control system and output control circuit for individually controlling the levels of optical signals, having different wavelengths, contained in a wavelength-division-multiplexed optical output signal.

A WDM optical transmission system multiplexes optical signals having different wavelengths into a wavelength-division-multiplexed optical signal and transmits the same through an optical fiber. This system is capable of increasing the transmission capacity of each optical fiber depending on the number of optical signals multiplexed.

The optical amplifier for amplifying such a multiplexed optical signal must properly set the output level of each of the optical signals and, when the number of wavelengths of the optical signals is two, minimize the effect of the gains of the amplifier on the optical signals.

2. Description of the Related Art

An optical amplifier employing an erbium (Er)doped optical fiber is often used because it effectively amplifies the 1.55-μm-band optical signals that are generally used in optical communication. This kind of optical amplifier is useful as a post-amplifier for a transmitter, a preamplifier for a receiver, or an in-line amplifier for a repeater, to extend the transmission distance at low cost.

Wavelength division multiplexing (WDM) effectively increases transmission capacity, and multiplexing 1.55-μm-band optical signals is preferred. To multiplex and demultiplex optical signals of different wavelengths, optical devices must be employed. Employing optical devices, however, causes a loss of transmission distance. To compensate for the loss, optical amplifiers are needed. A combination of WDM and optical amplifiers forms a favorable means to transmit many optical signals over a large distance.

Optical amplifiers usually employ a constant output control technique. This technique is adopted not only for amplifying a single-wavelength optical signal but also for amplifying a wavelength-division-multiplexed optical signal composed of a plurality of optical signals having individual wavelengths, to provide a constant optical output level.

The wavelength-division-multiplexed optical signal usually consists of two optical signals having different wavelengths, one in a 1.535-μm band and the other in a 1.55-μm band. These bands are favorable because erbium-doped optical fibers of the optical amplifier provide high gains on signals in the range of 1.52 μm to 1.54 μm and in the range of 1.54 μm to 1.57 μm.

According to the constant output control technique, the total output level of the amplifier is constant, and therefore, the level of each of the optical signals is obtained by dividing the total output level by the number of the optical signals. Accordingly, the levels of the optical signals may be insufficient when they arrive at a receiver. If one of the optical signals is absent due to some reason, the level of the absent optical signal is distributed to the other optical signals, to increase the levels thereof. This may cause an error at a receiver. On the other hand, if an optical signal having its own wavelength is added, it will decrease the levels of the other optical signals. This is a first problem of the conventional WDM optical amplifier.

The gain of the WDM optical amplifier has wavelength dependency. The wavelength dependency sometimes causes a reception error, which is aggravated by fluctuations in a light source in an optical terminal, in a multiplexer-demultiplexer, or in transmission fibers. Namely, these fluctuations change the levels of the optical signals contained in a wavelength-division-multiplexed optical signal at a receiver. Then, the receiver cannot detect every optical signal. In particular, any optical signal at a low level easily causes a reception error. This is a second problem of the conventional WDM optical amplifier.

The WDM optical amplifier of the prior art prepares a monitor signal and checks the level of the monitor signal to keep the optical output of the amplifier constant. Due to the second problem mentioned above, the gain of the amplifier for the optical output is not always equal to that for the monitor signal. This results in fluctuations in the optical output of the amplifier. Preparing the monitor signal involves additional costs. The monitor signal will not be a true representative of the optical output of the amplifier if the system for preparing the monitor signal fails.

The WDM optical amplifier of the prior art involves a gain tilt. When collectively amplifying two optical signals with one excitation beam, the optical amplifier causes a gain tilt to weaken one optical signal relative to the other depending on the wavelength of the excitation beam, although the amplifier uniformly amplifies a single optical signal.

SUMMARY OF THE INVENTION

To solve these problems in the prior art, an object of the present invention is to provide a wavelength division-multiplexing (WDM) optical amplifier capable of optimizing the output level of each optical signal having an individual wavelength, and minimizing the effect, due to the amplifier, on two optical signals having different wavelengths.

In order to accomplish the object, the present invention provides an optical amplifier for amplifying a wavelength-division-multiplexed optical input signal composed of optical signals having different wavelengths, the level of the optical output of the amplifier being controlled according to the number of the optical signals.

To control the level of the optical output of the amplifier, the power of an excitation beam is controlled. The optical output of the amplifier is controlled so that each of the optical signals has a given output level. Alternatively, the optical output of the amplifier is controlled according to an external reference input that is set according to the number of the optical signals. The external reference input corresponding to the number of the optical signals may be set through a switch.

The number of the optical signals is detected, and the optical output of the amplifier is controlled accordingly. To detect the number of the optical signals, the input signal is branched, the branched signal is demultiplexed through a filter into the optical signals, and the optical signals are checked to see if they are present. Alternatively, the optical signals are modulated with different frequencies and are multiplexed into the wavelength-division-multiplexed optical input signal. The input signal is converted into an electric signal, which is separated into modulation frequency components. The modulation frequency components are checked to see if they are present, to thereby determine the number of the optical signals. The modulation frequencies are selected to suppress induced Brillouin scattering in an optical fiber that transmits the optical signal.

The present invention also provides an optical amplifier for amplifying a wavelength-division-multiplexed optical input signal composed of optical signals having different wavelengths, the level of each of the signals being detected to control the gain of the amplifier so that the weakest one of the optical signals may have a required output level and each of the optical signals may secure the required output level or more.

To detect the level of each of the optical signals, the input signal is demultiplexed through a filter into the optical signals, the optical signals are converted into electric signals, and the levels of the electric signals are measured to determine the levels of the optical signals. Alternatively, the optical signals may be modulated with different frequencies and are multiplexed into the wavelength-division-multiplexed optical input signal. The input signal is converted in the amplifier into an electric signal, which is separated into modulation frequency components. The levels of the modulation frequency components are measured to determine the level of each of the optical signals.

The amplifier is provided with a unit for detecting the presence of each of the optical signals so that any optical signal that is absent is excluded from the control of securing a required output level for each of the optical signals that are present.

The present invention also provides an optical amplifier for amplifying a wavelength-division-multiplexed optical input signal composed of an optical signal of 1.535-μm-band wavelength and an optical signal of 1.55-μm-band wavelength, by sending the input signal to an erbium-doped optical fiber and by simultaneously applying an excitation beam of 0.98-μm-band wavelength and an excitation beam of 1.48-μm-band wavelength to the optical fiber, when the gain of the amplifier on the optical signal of 1.535-μm-band wavelength is greater than that on the optical signal of 1.55-μm-band wavelength with respect to the excitation beam of 0.98μm-band wavelength, and when the gain of the amplifier on the optical signal of 1.535-μm-band wavelength is smaller than that on the optical signal of 1.55-μm-band wavelength with respect to the excitation beam of 1.48μm-band wavelength.

The excitation beam of 0.98-μm-band wavelength and the excitation beam of 1.48-μm-band wavelength may be multiplexed and applied to the optical fiber to amplify the input signal. Alternatively, these excitation beams may be applied to different locations of the optical fiber, respectively, to amplify the input signal.

BRIEF DESCRIPTION OF THE DRAWINGS

The present invention will be more clearly understood from the description, as set forth below, with reference to the accompanying drawings in which:

FIG. 1 is a block diagram showing a system for controlling an optical amplifier;

FIG. 2 is a block diagram showing a WDM optical amplifier according to a prior art;

FIG. 3 is a block diagram showing a WDM optical amplifier involving two optical signals having different wavelengths, according to a prior art;

FIG. 5 is a block diagram showing a gain measuring system of a WDM optical amplifier;

FIG. 7 shows characteristic curves for explaining a gain tilt of a WDM optical amplifier;

DESCRIPTION OF THE PREFERRED EMBODIMENTS

Figure 4A:
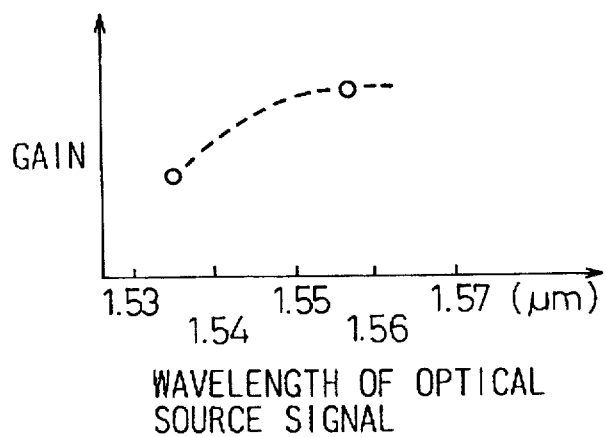
FIG. 4(a) shows the gain characteristic of the amplifier of FIG. 3 with respect to a 1.48-μm excitation beam.

For a better understanding of the preferred embodiments of the present invention, the problem in the prior art will be explained.

FIG. 1 shows a system for controlling an optical amplifier, according to a prior art, employing the constant output control technique. The system includes an erbium-doped optical fiber 1, an excitation laser diode 2 for applying an excitation beam to the optical fiber 1, a multiplexer-demultiplexer 3 for combining the excitation beam with an optical signal and providing an optical output signal, and a drive circuit 4 for driving the laser diode 2.

An optical input signal is sent to the optical fiber 1 through an isolator 5 that isolates the optical fiber 1 from the input. The optical fiber 1 amplifies the input signal according to the excitation beam and provides an amplified optical output signal, which is sent out through an isolator 6.

A branching device 7 branches a part of the optical output signal. The branched part is converted by a photosensor 8 into an electric signal whose level is detected by a level detector 9. A comparator 10 compares the detected level with a reference voltage VREF, and according to the difference between them, controls the drive circuit 4. The drive circuit 4 drives the laser diode 2 accordingly. In this way, the strength of the excitation beam emitted from the laser diode 2 is controlled to keep the optical output signal constant.

A branching device 11 is connected to the input end, to branch a part of the optical input signal. The branched part is converted by a photosensor 12 into an electric signal. An absence detector 13 checks the level of the electric signal, and upon detecting an absence of the input signal, issues a shutdown signal to stop the drive circuit 4 and turn off the excitation beam of the laser diode 2. If the laser diode 2 is not turned off, the control system for keeping the optical output of the amplifier constant increases its gain to only amplify noise. If an optical input signal resumes under this state, the system will excessively increase the optical output to badly affect a receiver.

FIG. 2 shows a wavelength-division-multiplexing (WDM) optical amplifier according to a prior art. The amplifier has an optical fiber 14, a semiconductor laser amplifier 15, a branching device 16 for branching a part of an optical output signal of the laser amplifier 15, a drive circuit 17 for driving the laser amplifier 15, a demultiplexer 18 for demultiplexing the branched output signal into an optical signal, a photosensor 19 for converting the optical signal into an electric signal, and a gain controller 20 for controlling the gain of the laser amplifier 15.

The input signal to the amplifier is a wavelength-division-multiplexed optical signal composed of optical signals λ1 and λ2, as well as an optical monitor signal μm. The branching device 16 separates, some of the optical output signal, and the demultiplexer 18 separates the monitor signal Am from the branched output signal. The monitor signal Am is converted by the photosensor 19 into an electric signal. The gain controller 20 compares the level of the electric signal with a reference voltage (not shown), and according to the difference between them, controls the drive circuit 17 to keep the gain of the laser amplifier 15 constant.

Like the amplifier of the prior art of FIG. 1 for amplifying a single-wavelength optical signal, the WDM amplifier of the prior art of FIG. 2 employs a constant output control technique to always provide an optical output signal of constant strength.

The wavelength-division-multiplexed optical signal amplified by this amplifier is composed of, for example, two optical signals having different wavelengths, e.g., a 1.535-μm-band wavelength and a 1.55-μm-band wavelength. The reason why these wavelengths are selected is because an erbium-doped optical fiber of the amplifier shows high gains on signals whose wavelength ranges from 1.52 μm to 1.54 μm and on signals whose wavelength ranges from 1.54 μm to 1.57 μm.

FIG. 3 shows a WDM optical amplifier for handling two optical signals having different wavelengths, according to a prior art. The same reference marks as those of FIG. 1 represent like parts. The amplifier of FIG. 3 has a multiplexer 21 for multiplexing an optical signal 1 of 1.535-μm-band wavelength and an optical signal 2 of 1.55-μm-band wavelength, and a WDM coupler 22 for multiplexing and demultiplexing a wavelength-division-multiplexed optical signal and an excitation beam.

The multiplexer 21 multiplexes the optical signals 1 and 2. The multiplexed signal is sent to an erbium-doped optical fiber 1 through an isolator 5. An excitation beam from an excitation laser diode 2 is sent to the optical fiber 1 through the WDM coupler 22 to amplify the optical signals 1 and 2. The amplified signal is sent outside through an isolator 6.

Figure 4B:
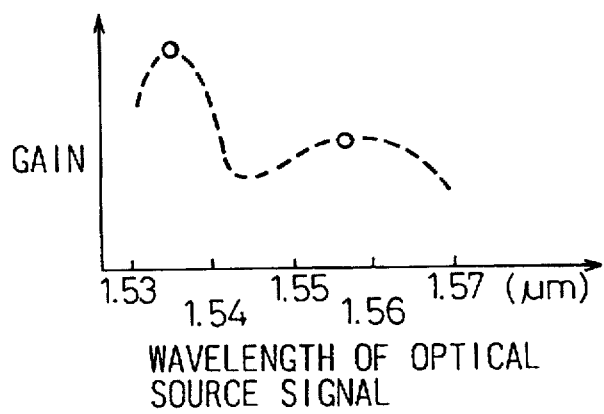
FIG. 4(b) shows the gain characteristic of the amplifier of FIG. 3 with respect to a 0.98-μm excitation beam.

FIGS. 4(a) and 4(b) show the gain characteristic of the optical amplifier of FIG. 3, in which FIG. 4(a) shows the gain characteristic with an excitation beam of 1.48-μm-band wavelength (hereinafter referred to as the 1.48-μm excitation), and FIG. 4(b) shows the gain characteristic with an excitation beam of 0.98-μm-band wavelength (hereinafter referred to as the 0.98 excitation). In FIG. 4(a), the 1.48-μm excitation achieves a large gain on the optical signal 2 of 1.55-μm-band wavelength. In this case, the optical signal 1 of 1.535-μm-band wavelength is hardly transmitted. In FIG. 4(b), the 0.98-μm excitation achieves a large gain on the optical signal 1 of 1.535-μm-band wavelength, and the optical signal 2 of 1.55-μm-band wavelength is hardly transmitted.

FIG. 5 shows a gain measuring system for a WDM optical amplifier. The same reference marks as those of FIG. 3 represent like parts. This system has a spectrum analyzer 23 for measuring the spectral distribution of an optical output signal.

A multiplexer 21 multiplexes an optical signal 1 (λ=1.56 μm) and an optical signal 2 (λ=1.53 μm to 1.57 μm). The multiplexed signal is sent to an erbium-doped optical fiber 1 through an isolator 5. An excitation laser diode 2 emits an excitation beam (λ=1.48 or 0.98 μm), which is applied to the optical fiber 1 through a WDM coupler 22 to amplify the multiplexed signal. The amplified signal is sent to the spectrum analyzer 23 through an isolator 6, and the spectrum analyzer 23 measures the output levels of the optical signals according to their spectra.

When the amplifier of the prior art of FIG. 1 is employed to amplify a wavelength-division-multiplexed optical signal, it provides an optical output signal of constant level. Namely, the level of each optical signal contained in the output signal is obtained by dividing the total output level by the number of the optical signals. Accordingly, the optical signals may have insufficient levels when they arrive at a receiver. If one of the optical signals is absent due to some reason, the level of the absent optical signal is distributed to the other optical signals, to increase the levels thereof. This may cause an error at a receiver. On the other hand, if an optical signal having its own wavelength is added, it will decrease the levels of the other optical signals. This is the problem of the conventional WDM optical amplifier.

The gain of the WDM optical amplifier is wavelength dependent. The wavelength dependency sometimes causes a reception error, which is aggravated by fluctuations in a light source of an optical terminal, multiplexerdemultiplexers, and transmission fibers. Namely, these fluctuations change the levels of optical signals contained in a wavelength-division-multiplexed optical signal from one another at a receiver. Then, the receiver cannot detect the optical signals individually. In particular, any optical signal of low level easily causes a reception error. This is another problem of the conventional WDM optical amplifier.

The amplifier of the prior art of FIG. 2 prepares a monitor signal and checks the level of the monitor signal to keep the optical output of the amplifier constant. Due to the problem mentioned above, the gain of the amplifier on the optical output is not always equal to that on the monitor signal. This results in the optical output of the amplifier fluctuating. Preparing the monitor signal involves additional costs. The monitor signal will not be a true representative of the optical output of the amplifier if the system for preparing the monitor signal fails.

Figure 6A:
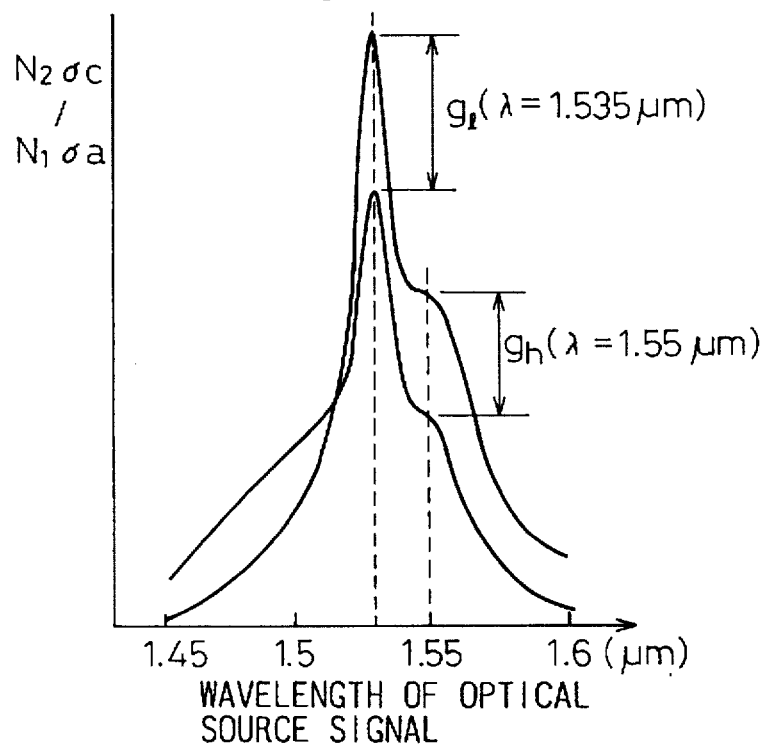
FIG. 6(a) shows the gain characteristic of a WDM optical amplifier with a small N2/(N2−N1)
Figure 6B:
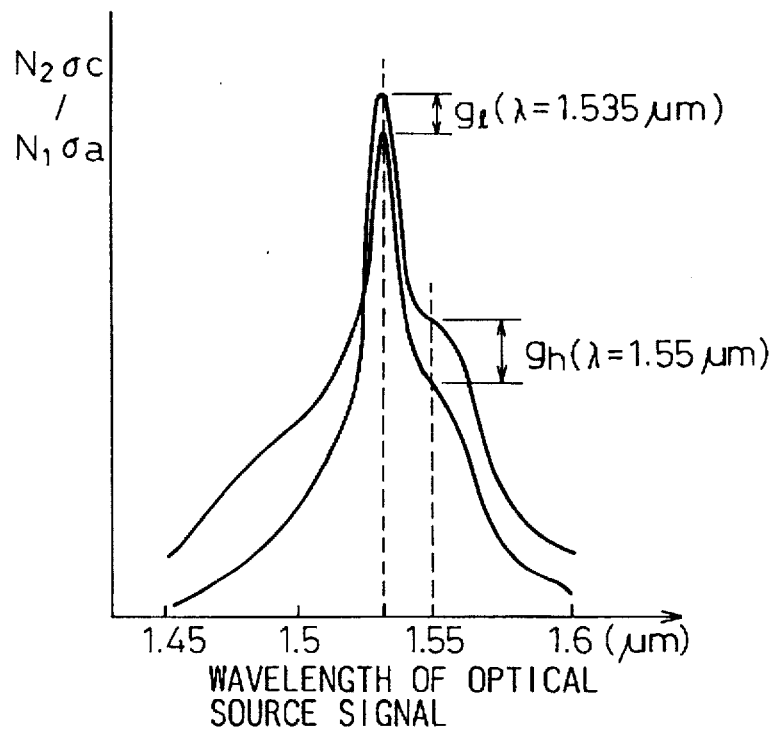
FIG. 6(b) shows the gain characteristic of a WDM optical amplifier with a large N2/(N2−N1)

FIGS. 6(a) and 6(b) explain the gain characteristic of a WDM optical amplifier, in which FIG. 6(a) is with a small N2/(N2−N1) and FIG. 6(b) is with a large N2/(N2−N1). Here, N1 is the number of photons in a ground state, and N2 is the number of photons in an excited state. An ordinate represents emitted energy N2σe (σe being a cross-sectional emission area) and absorbed energy N1σa (σa being a cross-sectional absorption area), and an abscissa represents the wavelength (μm) of an optical signal.

The difference between the emitted energy N2σe and the absorbed energy N1σa corresponds to the gain of the amplifier. When N2/(N2−N1) is small, i.e., when the distribution of the ground state is sufficiently small and the distribution of the excited state is sufficiently large, the gain gl ($\lambda$=1.535 μm) of the amplifier around a wavelength of 1.535 μm is larger than the gain gh ($\lambda$=1.55 μm) of the amplifier around a wavelength of 1.55 μm. On the other hand, when N2/(N2−N1) is large, i.e., when the distribution of the excited state is not sufficiently large, gl ($\lambda$=1.535 μm) is smaller than gh ($\lambda$=1.55 μm).

When an excitation beam of 1.48-μm-band wavelength is employed, the cross-sectional emission area extends nearly to 1.45 μm, and therefore, it is difficult to zero the distribution of the ground state. When the amplifier serves as a post-amplifier for a multiplexed signal containing two optical signals, N2/(N2−N1) becomes larger so that gl ($\lambda$=1.535 μm) becomes smaller than gh ($\lambda$=1.55 am) to cause a gain tilt.

FIG. 7 shows an example of a gain tilt when optical signals 1 and 2 are collectively amplified with an excitation beam of 1.48 μm in wavelength. An ordinate represents the output level of the optical signal 2, and an abscissa represents the wavelength of the optical signal 2. A curve "A" is obtained when only the wavelength of the optical signal 2 is changed without the optical signal 1. A curve "B" is obtained when the wavelength of the optical signal 2 is changed from 1.53 μm to 1.57 μm with the wavelength of the optical signal 1 being fixed at 1.56 μm.

As shown in the figure, the amplifier shows a flat amplification characteristic with respect to a single optical signal, while it causes a gain tilt with respect to two optical signals that are collectively amplified. In the latter case, the output level of the optical signal 2 drops in a short-wavelength region.

When an excitation beam of 0.98 μm in wavelength is employed, it will sufficiently reduce the distribution of the ground state, to provide the gain characteristics of FIGS. 6(a) and 6(b). This is because no emission occurs around the excitation wavelength of 0.98 μm, unlike the excitation beam of 1.48 μm.

Figure 8A:
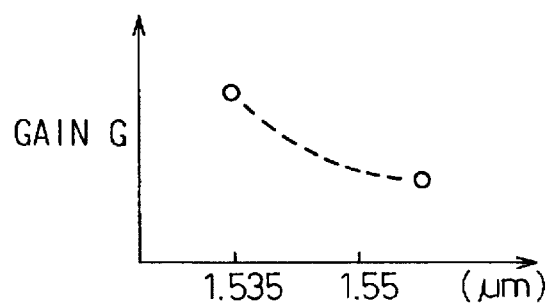
FIG. 8(a) shows changes in the gain characteristic of a WDM optical amplifier with weak optical signals or a strong excitation beam.
Figure 8B:
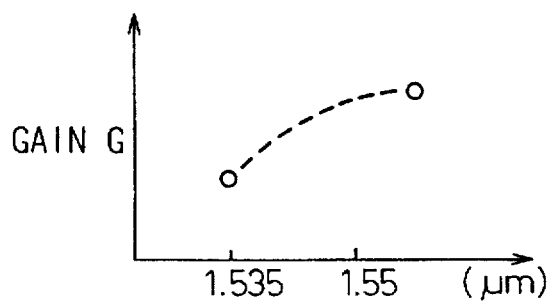
FIG. 8(b) shows changes in the gain characteristic of a WDM optical amplifier with strong optical signals or a weak excitation beam.

FIGS. 8(a) and 8(b) show changes in the gain characteristic of a WDM optical amplifier with respect to an excitation beam of 0.98 μm in wavelength, in which FIG. 8(a) is with a weak optical signal or a strong excitation beam, and FIG. 8(b) is with a strong optical signal or a weak excitation beam.

In FIG. 8(a), the gain of the amplifier for an optical signal of 1.535 μm in wavelength is larger than that for an optical signal of 1.557 μm in wavelength when the optical signals are weak or the excitation beam is strong. In FIG. 8(b), the gain of the amplifier on the optical signal of 1.535 μm in wavelength is smaller than that on the optical signal of 1.557 μm in wavelength when the optical signals are strong or the excitation beam is weak.

Figure 9:
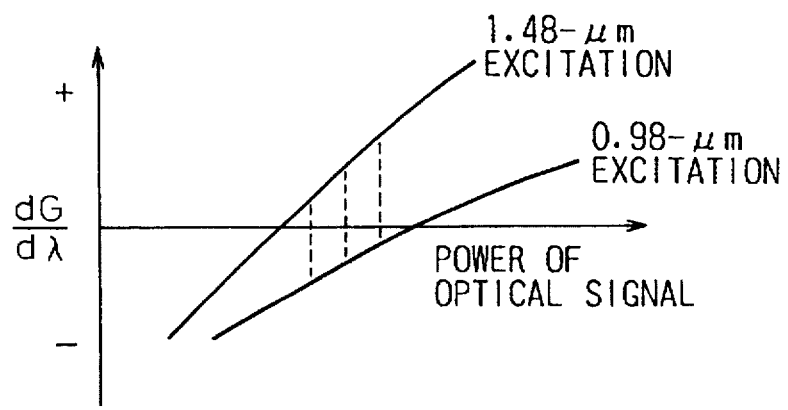
FIG. 9 shows changes in dG/dλ of a WDM optical amplifier with respect to excitation beams having different wavelengths.

FIG. 9 shows changes in dG/dλ of a WDM optical amplifier due to changes in the wavelength of an excitation beam. The 1.48-μm excitation involves a transition probability to a ground state, so that transition from FIG. 8(a) to FIG. 8(b) is speedier under the 1.48-μm excitation than under the 0.98-μm excitation when the strength of an optical signal is increased.

In FIG. 9, the 0.98-μm excitation keeps the shape of FIG. 8(a) in the range surrounded with dotted lines. On the other hand, the 1.48-μm excitation takes the shape of FIG. 8(b) that causes a gain tilt.

To solve these problems in the prior art, an object of the present invention is to provide a WDM optical amplifier capable of always optimizing the output level of each of optical signals having different wavelengths and minimizing a difference in the gain of the amplifier with respect to two optical signals having different wavelengths.

Now, preferred embodiments of the present invention will be explained in detail.

Figure 10:
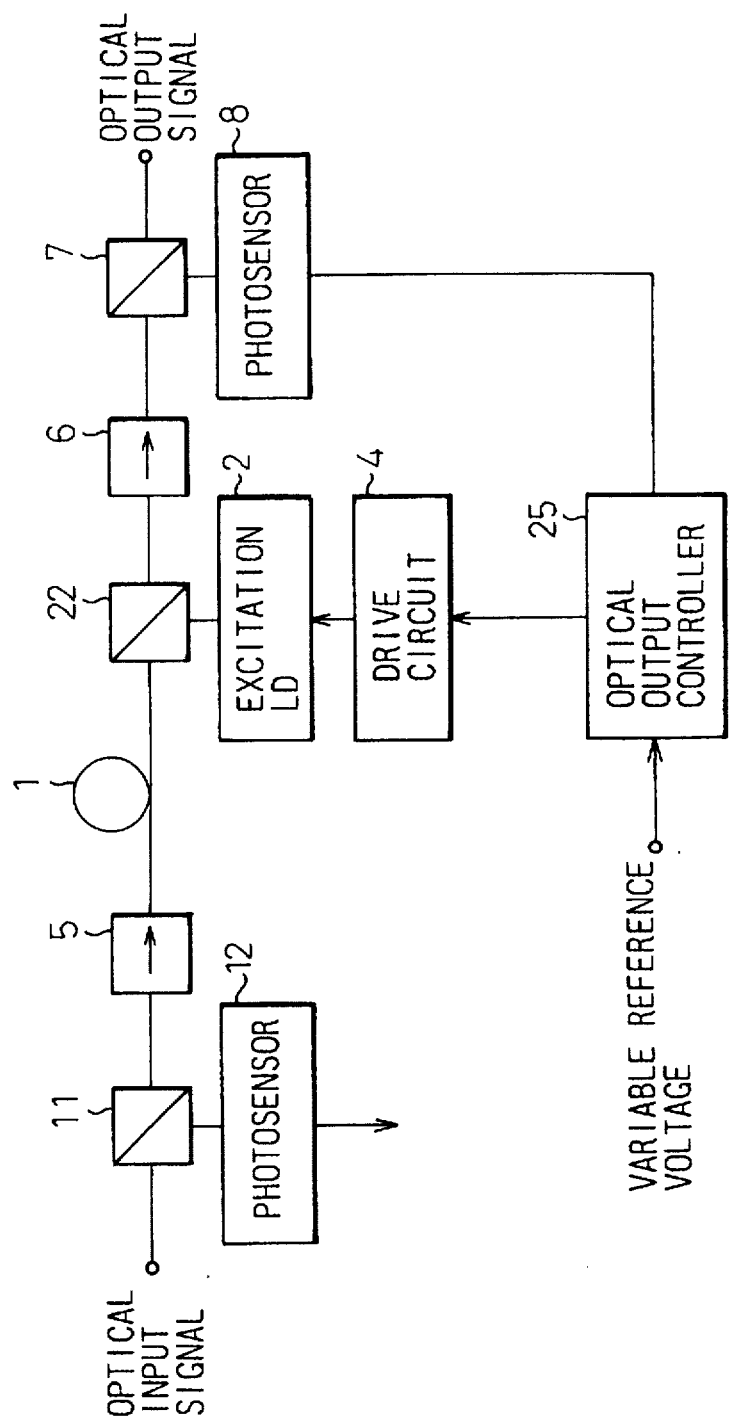
FIG. 10 is a block diagram explaining a first principle of the present invention.

FIG. 10 shows an optical amplifier according to the first principle of the present invention. The same reference marks as those of the preceding drawings represent like parts. This amplifier includes an optical output controller 25.

An optical input signal is sent to an erbium-doped optical fiber 1 through an isolator 5. The optical fiber 1 amplifies the input signal according to an excitation beam applied through a WDM coupler 22. The amplified signal is sent outside through an isolator 6.

A branching device 7 is arranged at an output end, to branch a part of the optical output signal. The branched part is converted by a photosensor 8 into an electric signal, which is sent to the optical output controller 25. The optical output controller 25 compares the electric signal with a variable reference voltage, and according to the difference between them, controls a drive circuit 4, which provides an excitation laser diode 2 with a drive current. The strength of an excitation beam emitted from the laser diode 2 is controlled accordingly, to control the level of the optical output signal.

A branching device 11 arranged at an input end separates a part of the optical input signal. The separated part is converted by a photosensor 12 into an electric signal. The level of the electric signal is checked by an absence detector (not shown). When the input signal is absent, the absence detector issues a shutdown signal to stop the drive circuit 4 and turn off the excitation beam from the laser diode 2.

The variable reference voltage that determines the output level of the amplifier is varied according to the number of optical signals contained in an optical input signal.

Namely, the output level of the amplifier is controlled such that the output level of each optical signal is always constant. When the output level of each of "N" optical signals must be Pout, the total output level of the amplifier is controlled to "Pout×N".

Figure 11:
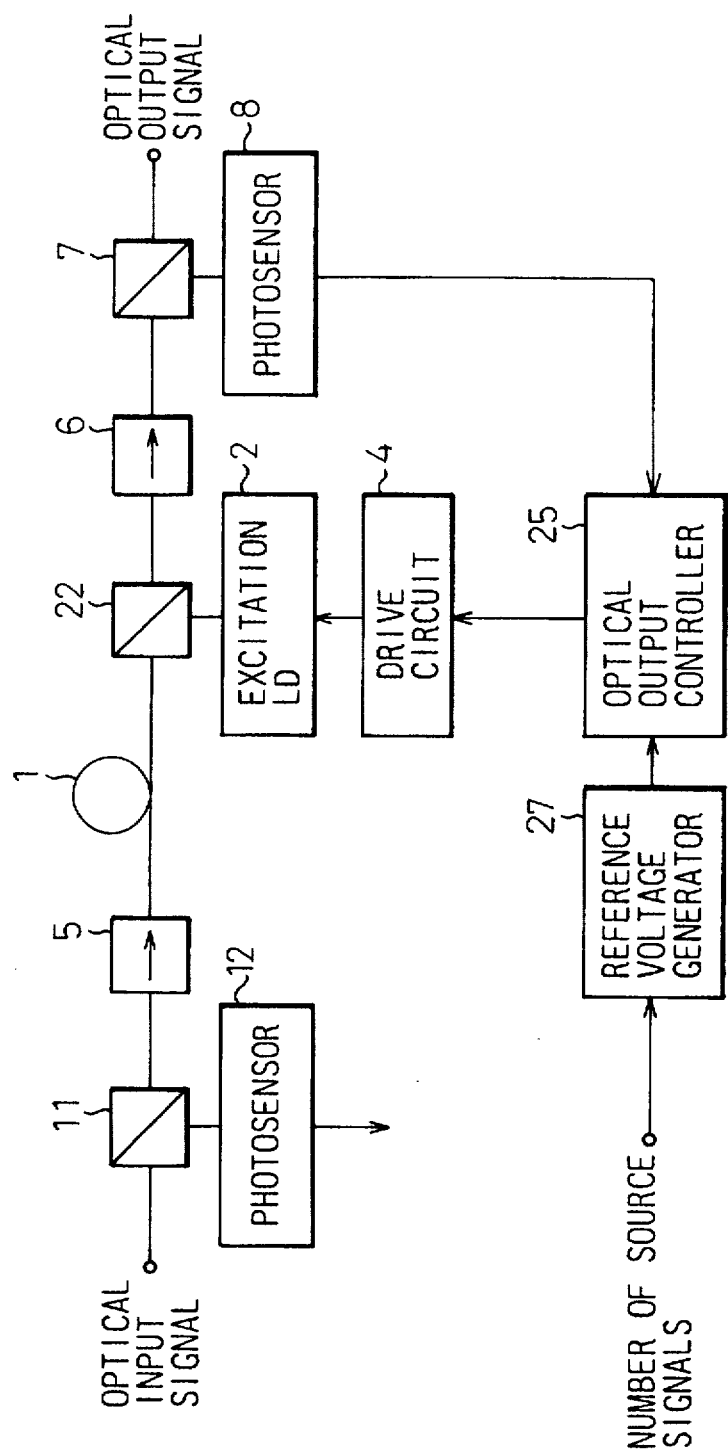
FIG. 11 is a block diagram explaining a second principle of the present invention.

FIG. 11 shows an optical amplifier according to the second principle of the present invention. The same reference marks as those of FIG. 10 represent like parts. This amplifier has a reference voltage generator 27 for generating a reference voltage corresponding to the number of optical signals contained in a wavelength division-multiplexed optical input signal.

The reference voltage is sent to an optical output controller 25. The optical output controller 25 compares the reference voltage with an electric signal that is provided by a photosensor 8 and corresponds to the level of an optical output signal. According to the difference between the compared signals, the optical output controller 25 controls a drive circuit 4, which provides an excitation laser diode 2 with a drive current. In response to the drive current, the strength of an excitation beam emitted from the laser diode 2 is controlled. Consequently, the level of the optical output signal is controlled according to the number of the optical signals.

Figure 12:
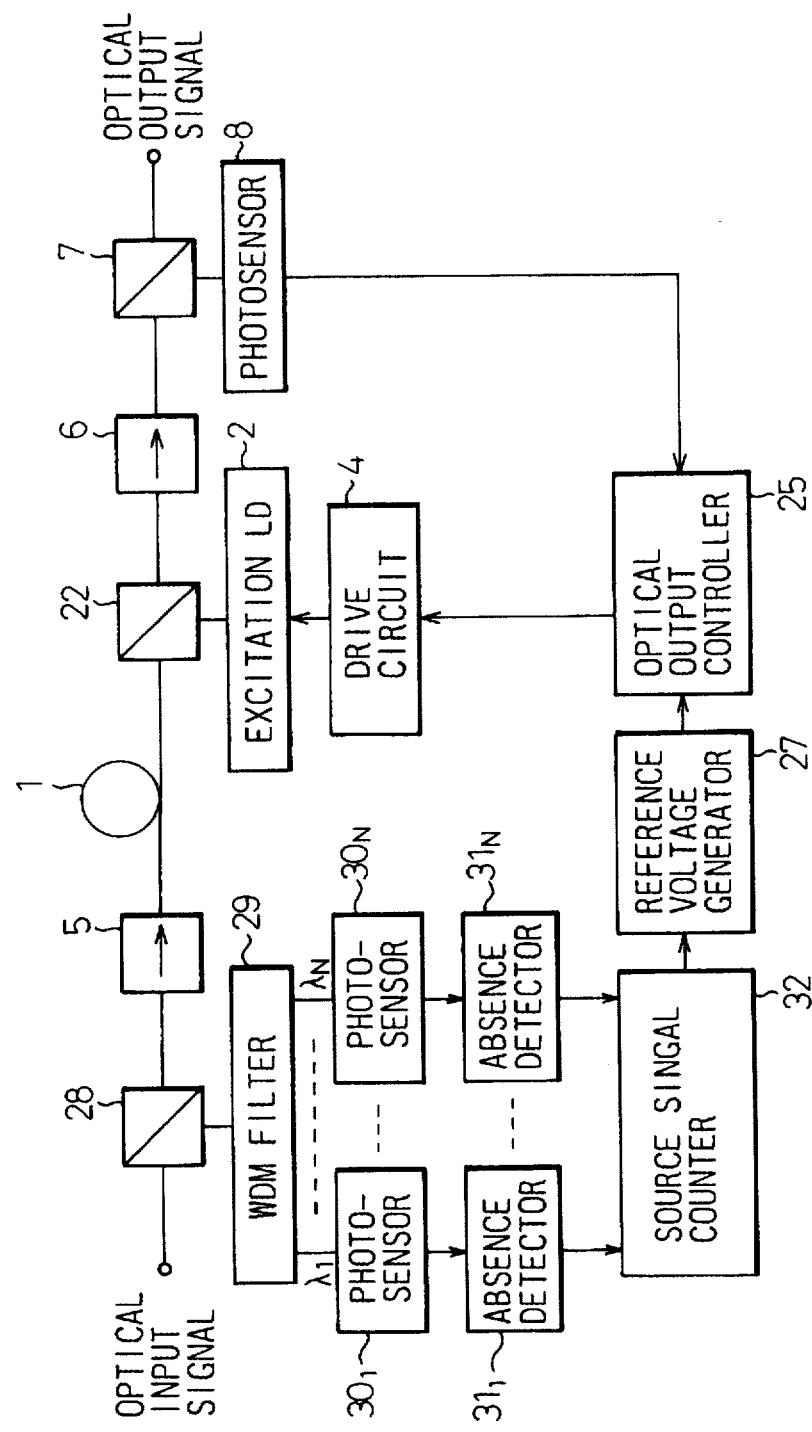
FIG. 12 is a block diagram explaining a third principle of the present invention.

FIG. 12 shows an optical amplifier according to the third principle of the present invention. The same reference marks as those of FIG. 11 represent like parts.

A branching device 28 divides a wavelength-divisionmultiplexed optical input signal. A WDM filter 29 demultiplexes the input signal into optical signals having wavelengths of $\lambda 1$ to $\lambda N$. Photosensors 301 to 30N convert the optical signals into electric signals, respectively. According to the electric signals, absence detectors 311 to 31N detect the presence or absence of the optical signals, respectively. According to the presence and absence information, an optical signal counter 32 provides the number of the optical signals.

According to the number of the optical signals, a reference voltage generator 27 generates a reference voltage, which is sent to an optical output controller 25. The optical output controller 25 controls the strength of an excitation beam emitted from an excitation laser diode 2 accordingly. As a result, the level of an optical output signal of the amplifier is controlled according to the number of the optical signals contained in the input signal.

Figure 13:
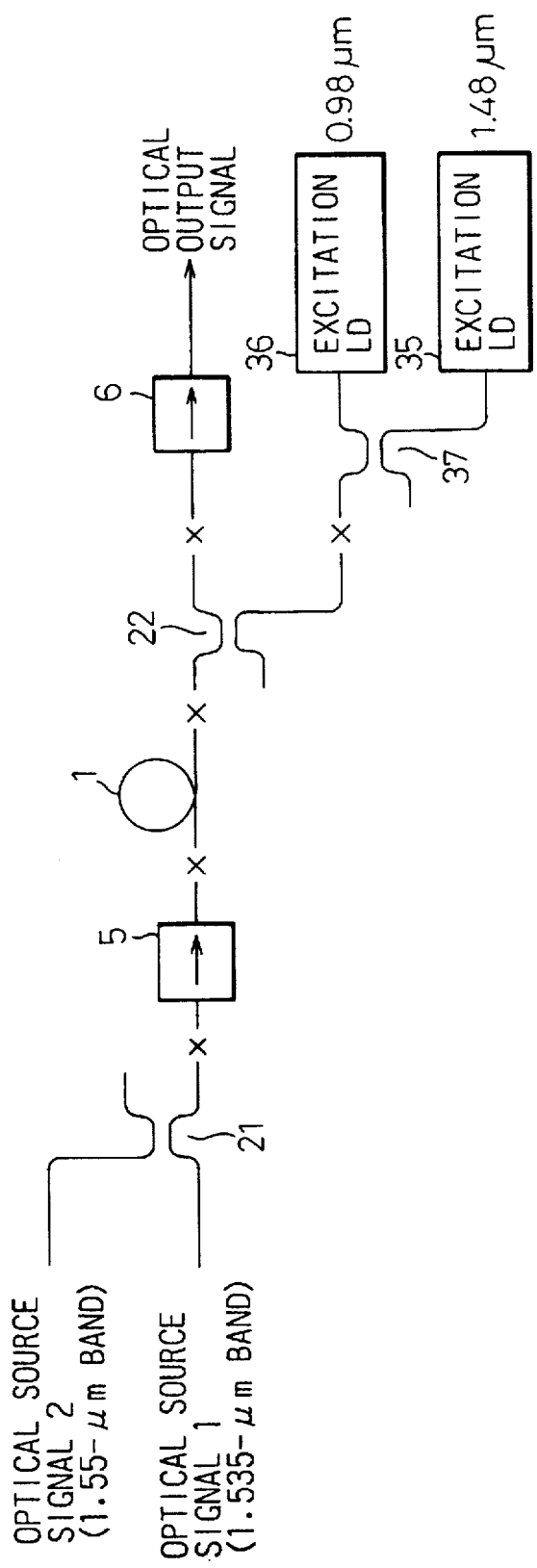
FIG. 13 is a block diagram explaining a fourth principle of the present invention.
Figure 14:
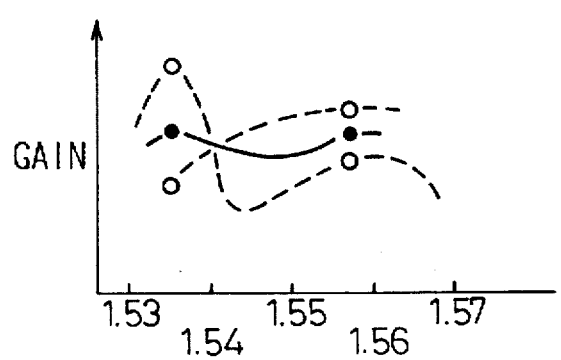
FIG. 14 shows the gain characteristic of the fourth principle of the present invention.

FIG. 13 shows an optical amplifier according to the fourth principle of the present invention. The same reference marks as those of FIG. 3 represent like parts. This amplifier has an excitation laser diode 35 for emitting an excitation beam of 1.48-μm-band wavelength, an excitation laser diode 36 for emitting an excitation beam of 0.98-μm-band wavelength, and a multiplexer 37. FIG. 14 shows the gain characteristic of the amplifier of FIG. 13.

The multiplexer 37 multiplexes the excitation beam of 1.48-μm-band wavelength and the excitation beam of 0.98-μm-band wavelength, and applies the multiplexed beam to an erbium-doped optical fiber 1. This amplifier shows an intermediate gain characteristic between the gain characteristics of FIGS. 4(a) and 4(b). Accordingly, this amplifier is capable of minimizing the difference between the gains thereof on an optical signal 1 having a wavelength of 1.535 μm and an optical signal 2 having a wavelength of 1.55 μm.

The functions and operations of the present invention are as follows:

(1) The present invention controls the total level of the optical output of the amplifier according to the number of optical signals of different wavelengths contained in a wavelength-division-multiplexed optical input signal.

Accordingly, a receiver always receives each of the optical signals at a required level. Even if one of the optical signals is absent, no reception error will occur because the level of each of the remaining optical signals is kept at the required level irrespective of the absence.

(2) The output control of the item (1) may be carried out by controlling the power of an excitation beam applied to the input signal.

(3) The output control of the item (1) may be carried out by keeping the level of each of the optical signals constant.

(4) The output control of the item (1) may be carried out according to an external reference input corresponding to the number of the optical signals.

(5) The external reference input of the item (4) may be changed through a switch.

(6) The output control of the item (1) may be carried out according to the number of the optical signals, which is detected by the amplifier itself.

(7) The detection of the number of the optical signals of the item (6) may be carried out by dividing the input signal, demultiplexing the signal into the optical signals through a filter, and determining the presence of each of the optical signals.

(8) The detection of the number of the optical signals of the item (6) may be carried out by modulating the optical signals with different frequencies, converting the input signal into an electric signal, separating the frequency-modulated components from one another according to the electric signal, and determining the presence of each of the frequency-modulated components.

(9) The frequencies of the item (8) used for modulating the optical signals are selected to suppress induced Brillouin scattering in an optical fiber for transmitting the optical signal.

(10) The present invention detects the level of each of the optical signals contained in the input signal and controls the gain of the amplifier so that the weakest one of the optical signals may have a required output level, and therefore, each of the optical signals may have the required output level or above.

Even if the gain of the amplifier has wavelength dependency, each of the optical signals will have a required reception level to cause no reception error.

(11) The detection of the level of each of the optical signals of the item (10) may be carried out by separating the optical signals from one another through a filter, converting the separated signals into electric signals, and detecting the levels of the electric signals.

(12) The detection of the level of each of the optical signals of the item (10) may be carried out by modulating the optical signals with different frequencies, converting the input signal into an electric signal, separating the frequency-modulated components from one another according to the electric signal, and measuring the level of each of the separated components, to determine the level of each of the optical signals.

(13) The detection of the level of each of the optical signals of the item (10) may be carried out with the use of a unit for determining the presence of each of the optical signals. Absent ones of the optical signals are excluded, and the gain of the amplifier is controlled so that the weakest one of the optical signals may have a required output level, and therefore, each of the optical signals that are present may have the required output level or more.

(14) According to the amplifier of the present invention, an optical signal of 1.535-μm-band wavelength and an optical signal of 1.55-μm-band wavelength are transmitted to an erbium-doped optical fiber. When an excitation beam of 0.98-μm-band wavelength is applied to the optical fiber, the gain of the amplifier for the optical signal of 1.535-μm-band wavelength is larger than that for the optical signal of 1.55-μm-band wavelength. When an excitation beam of 1.48-μm-band wavelength is applied to the optical fiber, the gain of the amplifier on the optical signal of 1.535-μm-band wavelength is smaller than that for the optical signal of 1.55-μm-band wavelength.

In this case, the present invention simultaneously applies the excitation beams of 0.98-μm-band wavelength and 1.48-μm-band wavelength to the optical fiber, to thereby equalize the gain of the amplifier on the optical signal of 1.535-μm-band wavelength with that on the optical signal of 1.55-μm-band wavelength.

(15) In the item (14), the excitation beams of 0.98-μm-band wavelength and 1.48-μm-band wavelength may be multiplexed and applied to the optical fiber.

(16) In the item (14), the excitation beams of 0.98-μm-band wavelength and 1.48-μm-band wavelength may be applied to different locations of the optical fiber, respectively.

Figure 15:
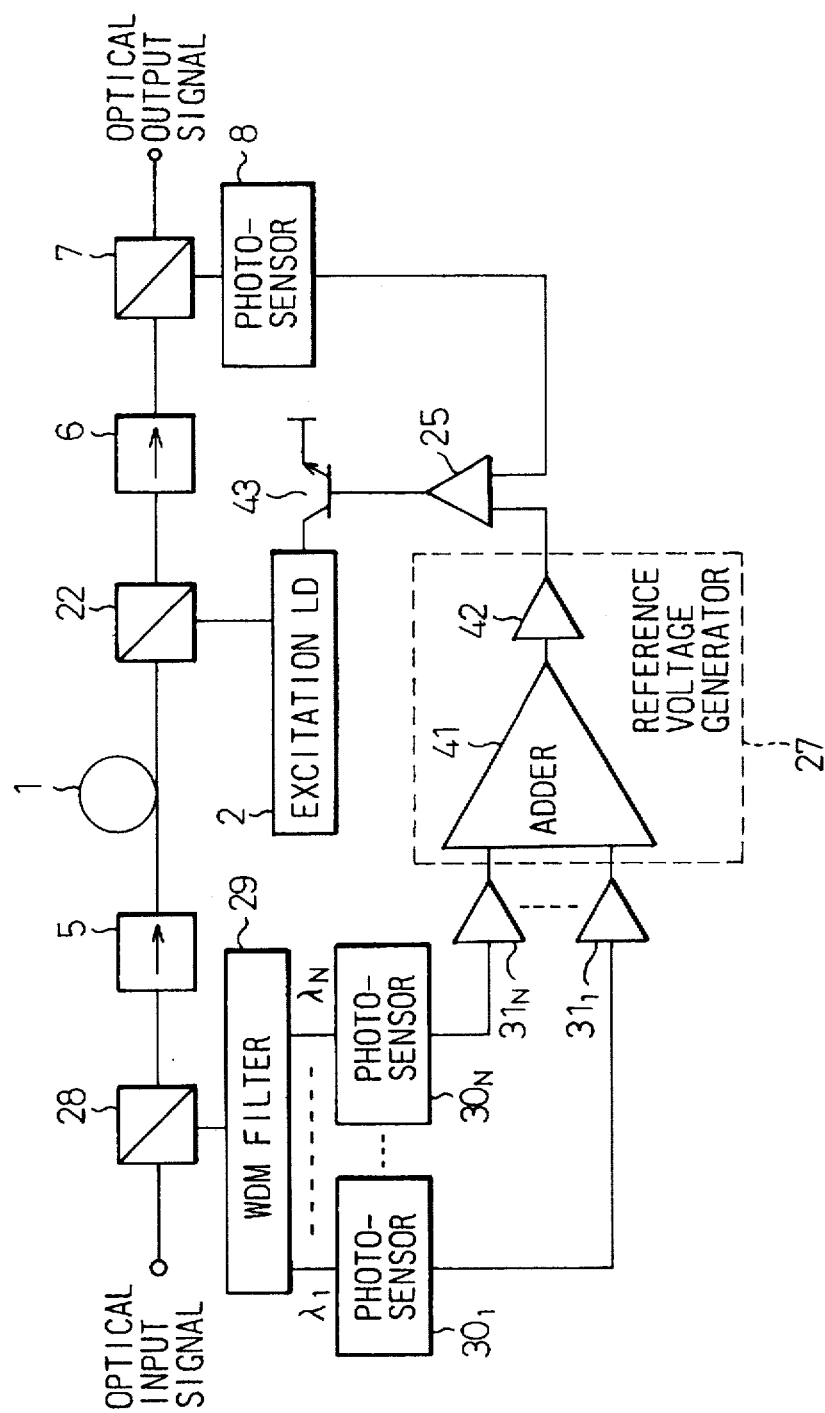
FIG. 15 is a block diagram showing a first embodiment of the present invention.

FIG. 15 shows a WDM optical amplifier according to the first embodiment of the present invention. The same reference marks as those of FIG. 12 represent like parts. This amplifier has a reference voltage generator 27. The reference voltage generator 27 has an adder 41, for adding voltage signals corresponding to the number of optical signals of different wavelengths contained in a wavelength-division-multiplexed optical input signal to each other, and a level converter 42 for converting the voltage signal corresponding to the number of the optical signals into a reference voltage. A transistor 43 drives an excitation laser diode 2.

A branching device 28 divides the input signal. The input signal is separated by a WDM filter 29 into the optical signals having wavelengths of $\lambda 1$ to $\lambda N$, which are converted by photosensors 301 to 30N into electric signals indicating the levels of the optical signals. Absence detectors 311 to 31N normalize each of the levels of the optical signals to 1 V to indicate presence or 0 V to indicate absence. The adder 41 adds the outputs of the absence detectors 311 to 31N to each other, to produce a voltage corresponding to the number of the optical signals.

The level converter 42 converts the voltage corresponding to the number of the optical signals into a reference voltage. A photosensor 8 provides a voltage representing the level of an optical output signal. An optical controller 25 compares the voltage provided by the photosensor 8 with the reference voltage from the level converter 42, and according to the difference between them, controls the transistor 43. The transistor 43 provides the laser diode 2 with a drive current. The laser diode 2 emits an excitation beam whose strength is controlled so that the level of the optical output signal may correspond to the number of the optical signals.

Figure 16:
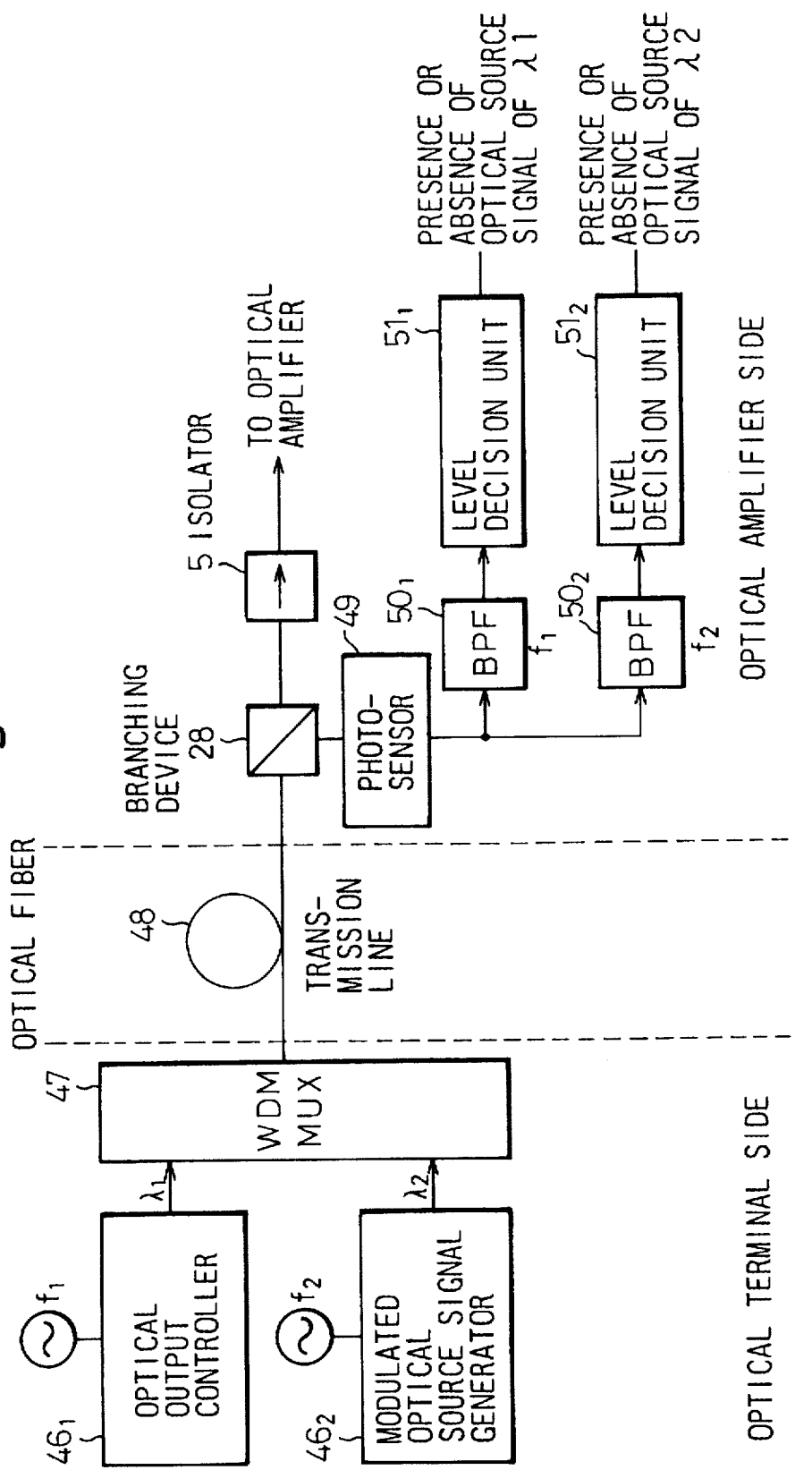
FIG. 16 is a block diagram showing a second embodiment of the present invention.

FIG. 16 shows an optical amplifier according to the second embodiment of the present invention. This embodiment determines whether or not each of optical signals contained in a wavelength-division-multiplexed optical signal is present. An optical terminal has a modulator 461 for modulating an optical signal of wavelength $\lambda 1$ with a frequency f1, and a modulator 462 for modulating an optical signal of wavelength $\lambda 2$ with a frequency f2. A WDM multiplexer 47 multiplexes the modulated optical signals into a wavelength-divisionmultiplexed optical signal. An optical fiber 48 transmits the optical signal and inputs the same into the optical amplifier. A branching device 28 of the optical amplifier separates the input signal. A photosensor 49 converts the signal into an electric signal. A band-pass filter 501 extracts the signal of frequency f1 from the electric signal. A band-pass filter 502 extracts the signal of frequency f2 from the electric signal. A level decision unit 511 determines the level of the signal of frequency f1 and provides information indicating the presence or absence of the optical signal of wavelength $\lambda 1$. A level decision unit 512 determines the level of the signal of frequency f2 and provides information indicating the presence or absence of the optical signal of wavelength $\lambda 2$.

The optical terminal modulates each optical signal with a frequency (phase) to identify the wavelength of the optical signal. Namely, the optical terminal modulates an optical signal having a wavelength of $\lambda 1$ with a frequency of f1, and an optical signal having a wavelength of $\lambda 2$ with a frequency of f2. These modulated signals are multiplexed by the WDM multiplexer 47 into a wavelength-division-multiplexed optical signal.

The amplifier converts a branched part of the optical input signal into an electric signal, which is passed through the band-pass filters to extract the optical signals modulated with the frequencies f1 and f2, respectively. The levels of these signals are checked to provide information about the presence or absence of the optical signals. Generally, the second embodiment employing the electric filters to detect optical signals is less expensive than the first embodiment that employs the WDM filter to separate optical signals.

An optical fiber causes induced Brillouin scattering when the spectral purity of an optical signal transmitted through the optical fiber is high and when the level of the signal is higher than a threshold. The induced Brillouin scattering hinders the transmission of the optical signal. The induced Brillouin scattering is suppressible by modulating the transmission signal with a phase or frequency that expands the spectral band width. This technique increases the level of the transmission signal. Accordingly, the second embodiment is effective to prevent induced Brillouin scattering.

The modulation frequencies must be sufficiently high to suppress induced Brillouin scattering. If the frequencies are too high, however, the effect of suppressing the induced Brillouin scattering deteriorates. This is because, when a modulator modulates the amplitude of a current to drive a laser diode, to modulate the frequency of a beam emitted from the laser diode, the extremely high frequency deteriorates the efficiency between the amplitude modulation and the frequency modulation. This results in narrowing a frequency modulation width, thereby deteriorating the effect of suppressing the induced Brillouin scattering. Accordingly, modulation frequencies employed by the second embodiment must properly be selected to suppress the induced Brillouin scattering.

Figure 17:
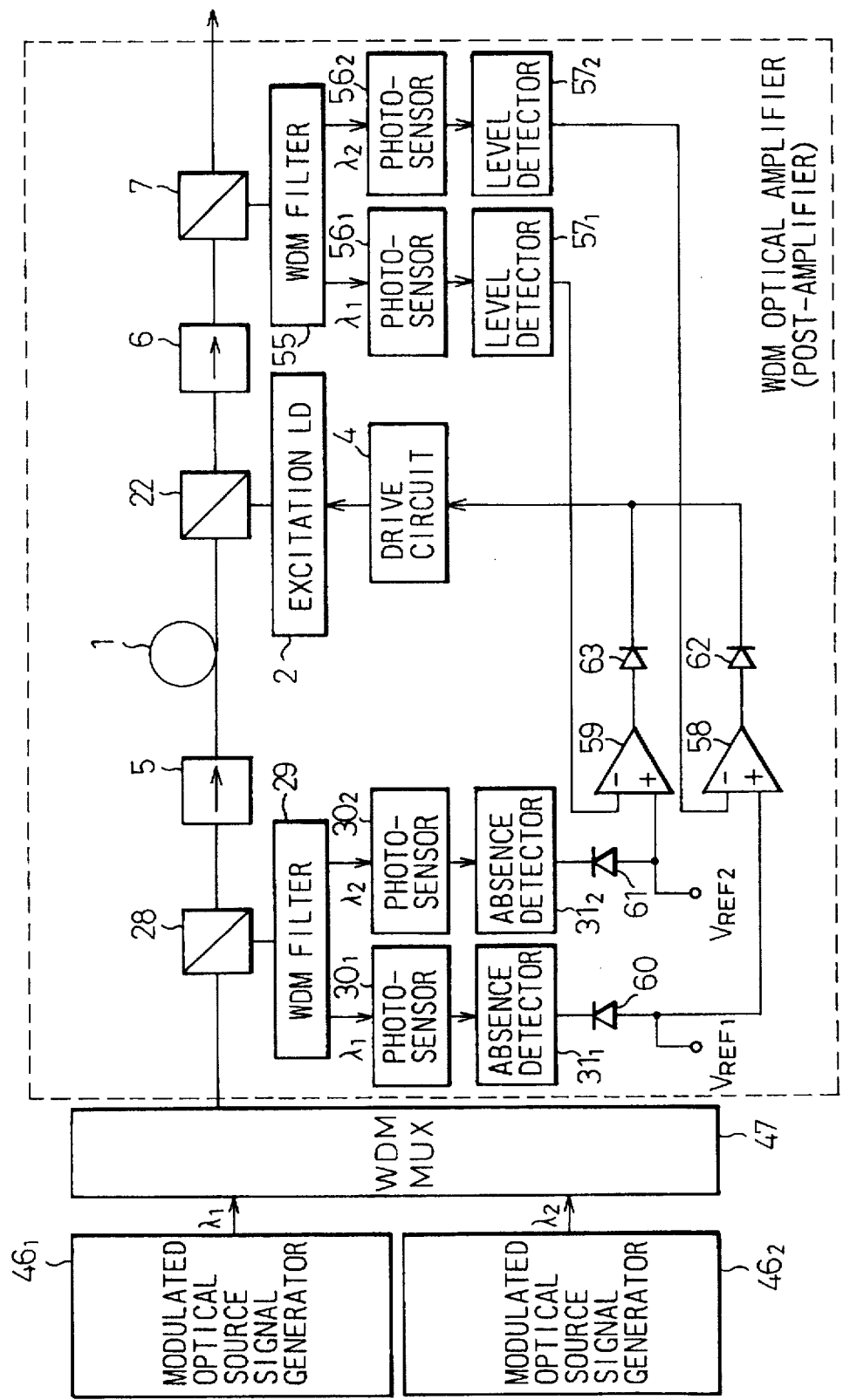
FIG. 17 is a block diagram showing a third embodiment of the present invention.

FIG. 17 shows a WDM optical amplifier according to the third embodiment of the present invention. This amplifier is employed as a post-amplifier. The same reference marks as those of FIGS. 12 and 16 represent like parts. For the sake of simplicity, a wavelength-division-multiplexed optical signal handled by this amplifier consists of two optical signals having individual wavelengths.

A branching device 7 separates a part of an optical output signal. A WDM filters 55 demultiplexes the signal into optical signals having wavelengths $\lambda 1$ and $\lambda 2$. Photosensors 561 and 562 convert the optical signals into electric signals, respectively. Level detectors 571 and 572 detect the levels of the electric signals, respectively.

A branching device 28 separates an optical input signal. The signal is separated by a WDM filter 29 into optical signals having wavelengths $\lambda 1$ and $\lambda 2$, respectively. The optical signals are converted by photosensors 301 and 302 into electric signals, respectively. According to the levels of the electric signals, absence detectors 311 and 312 determine the presence or absence of the optical signals.

Comparators 58 and 59 compare the levels provided by the level detectors 571 and 572 with reference levels VREF1 and VREF2, respectively. The comparators 58 and 59 provide outputs to logic diodes 62 and 63 to control a drive circuit 4. The drive circuit 4 drives an excitation laser diode 2. Accordingly, the strength of an excitation beam emitted from the laser diode 2 is subjected to feedback control according the weakest one of the optical signals. As a result, the difference between the levels of the optical signals is minimized.

If any one of the absence detectors 311 and 312 detects the absence of the corresponding optical signal and provides an output of 0 V, the output level of the corresponding comparator drops due to a corresponding one of logic diodes 60 and 61. Then, according to feedback control corresponding to the optical signal that is present, the drive circuit 4 drives the laser diode 2. Accordingly, an erbium-doped optical fiber 1 is never over excited.

As mentioned above, the embodiment of FIG. 17 solves the second problem of the prior art. Namely, this embodiment compensates for a drop in the level of a signal due to the wavelength dependency of the gain of the amplifier.

Figure 18:
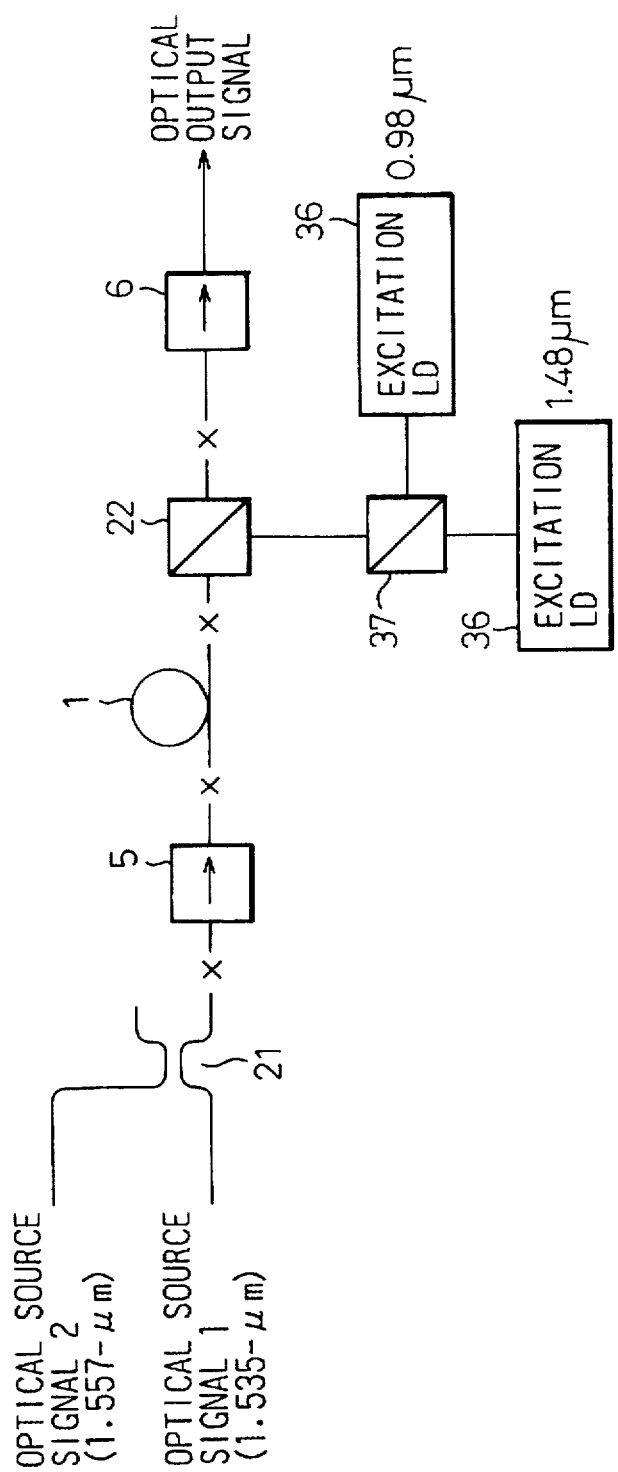
FIG. 18 is a block diagram showing a fourth embodiment of the present invention.

FIG. 18 shows an optical amplifier according to the fourth embodiment of the present invention. The same reference marks as those of FIG. 13 represent like parts.

An optical signal 1 having a wavelength of 1.535 μm and an optical signal 2 having a wavelength of 1.557 μm form a wavelength-division-multiplexed optical input signal. The input signal is passed through an isolator 5 and is sent to an erbium-doped optical fiber 1. An excitation laser diode 35 emits an excitation beam having a wavelength of 1.48 μm, and an excitation laser diode 36 emits an excitation beam having a wavelength of 0.98 μm. A multiplexer 37 multiplexes these excitation beams. The multiplexed excitation beam is made incident to the optical fiber 1 through a WDM coupler 22.

The optical fiber 1 amplifies the input signal accordingly. The amplified signal is transmitted through an isolator 6.

Since the optical fiber 1 is excited by the excitation beams of wavelengths of 1.48 μm and 0.98 μm, the amplifier provides a flat gain characteristic as shown in FIG. 14 when amplifying an input signal composed of optical signals of wavelengths of 1.535 μm and 1.557 μm.

Figure 19:
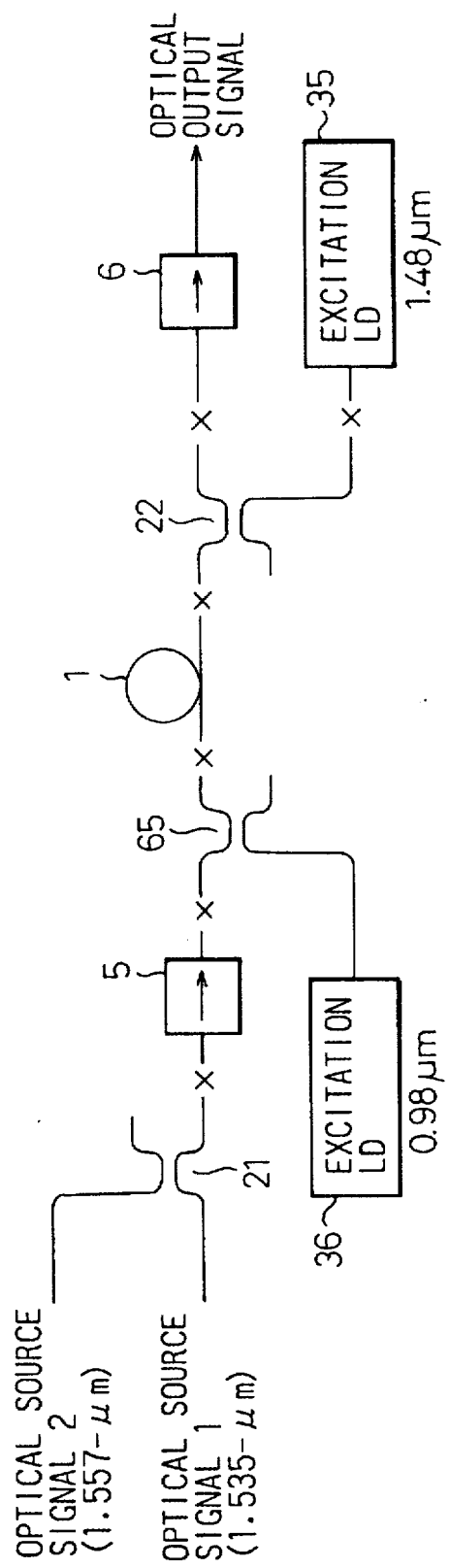
FIG. 19 is a block diagram showing a fifth embodiment of the present invention.

FIG. 19 shows an optical amplifier according to the fifth embodiment of the present invention. The same reference marks as those of FIG. 18 represent like parts. This embodiment has a WDM coupler 65.

An excitation laser diode 35 emits an excitation beam having a wavelength of 1.48 μm, which is made incident to an erbium-doped optical fiber 1 through a WDM coupler 22. An excitation laser diode 36 emits an excitation beam having a wavelength of 0.98 μm, which is made incident to the optical fiber 1 through the WDM coupler 65.

Consequently, an optical input signal to the optical fiber 1 is excited by the excitation beams of wavelengths of 1.48 μm and 0.98 μm. This amplifier provides a flat gain characteristic as shown in FIG. 14 when amplifying a wavelength-division-multiplexed optical signal composed of optical signals having wavelengths of 1.535 μm and 1.557 μm.

Figure 20:
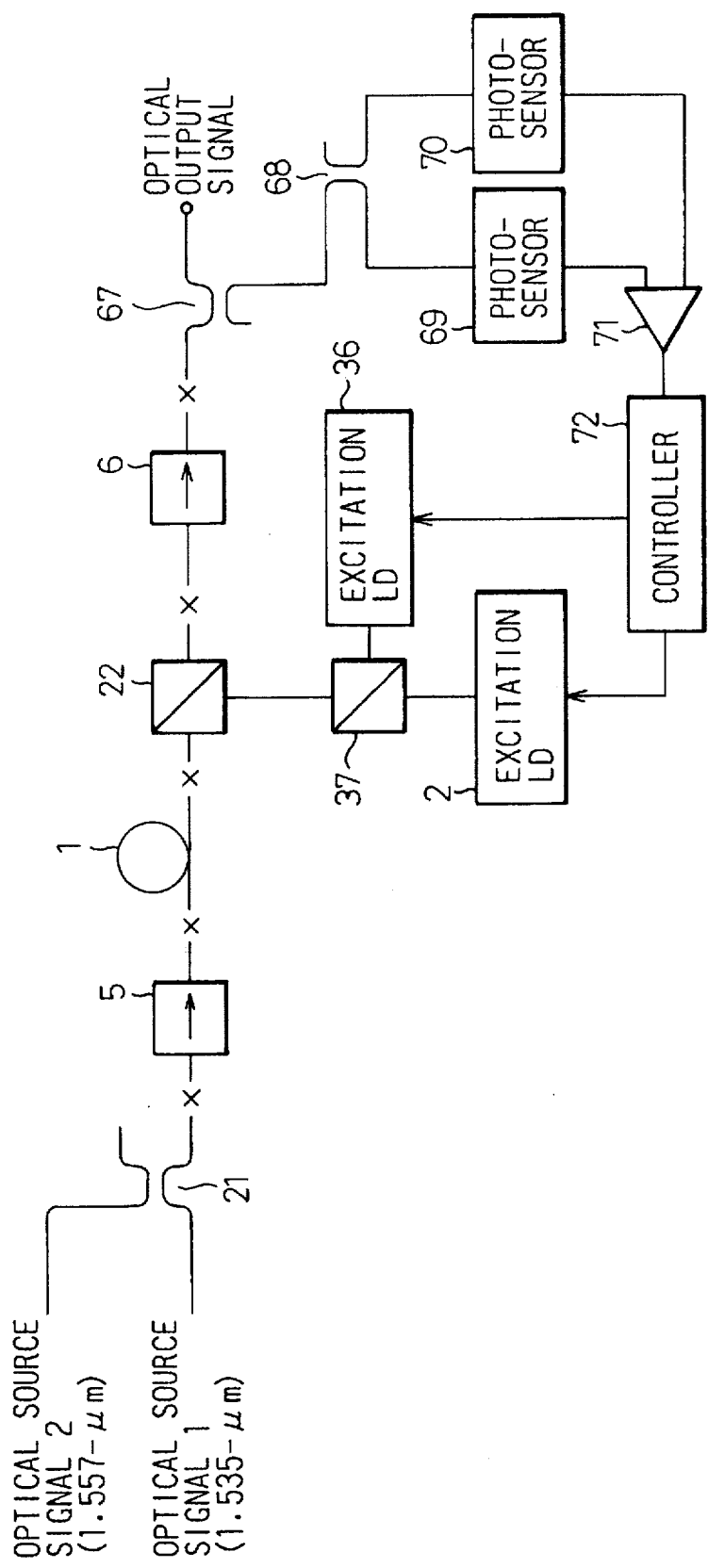
FIG. 20 is a block diagram showing a sixth embodiment of the present invention.

FIG. 20 shows an optical amplifier according to the sixth embodiment of the present invention. The same reference marks as those of FIG. 18 represent like parts.

A branching device 67 separates an optical output signal. The signal is separated by a WDM filter 68 into optical signals having wavelengths of 1.535 μm and 1.557 μm. Photosensors 69 and 70 convert the optical signals into electric signals, respectively. A comparator 71 compares the levels of the electric signals with each other. According to the comparison result, a controller 72 increases the strength of an excitation beam having a wavelength of 1.48 μm emitted from an excitation laser diode 35 or an excitation beam having a wavelength of 0.98 μm emitted from an excitation laser diode 36.

More precisely, if the level of the optical signal of 1.535 μm in wavelength is higher than the level of the other optical signal, the controller 72 controls the laser diode 35 to increase the strength of the excitation beam of 1.48 μm in wavelength. If the level of the optical signal of 1.557 μm in wavelength is higher than the level of the other optical signal, the controller 72 controls the laser diode 36 to increase the strength of the excitation beam of 0.98 μm in wavelength.

This technique minimizes the difference between the levels of the optical signals.

As explained above, a WDM optical amplifier according to the present invention controls the power of an excitation beam emitted from an excitation laser diode according to the number of optical signals contained in a wavelength-division-multiplexed optical input signal, thereby controlling the output level of the amplifier. Accordingly, each optical output signal of the amplifier of the present invention secures a required level at a receiver, to cause no reception error.

The optical amplifier according to the present invention employs an excitation beam of 1.48-μm-band wavelength and an excitation beam of a 0.98-μm-band wavelength to minimize the wavelength dependency of the gain of the amplifier on optical signals of 1.535-μm- and 1.55-μm-band wavelengths, to thereby minimize the difference between the levels of the optical signals at a receiver and prevent a reception error.

We claim:

1. An optical amplifier in an apparatus for amplifying a wavelength-division-multiplexed optical input signal, said input signal being composed of optical signal channels having respective wavelength bands, comprising:

means for providing a reference value that varies according to a number of channels conveying optical signals to be amplified, in response to detection of the presence of signals in the channels;

means for detecting a signal level of the wavelength division-multiplexed signal output from the optical amplifier; and means for controlling the output level of the amplifier in dependence upon a comparison between the detected signal level and the reference value, the level of the optical output of the amplifier being controlled according to the number of the optical signal channels having signals present.

2. The optical amplifier according to claim 1, wherein the level of the optical output of the amplifier is controlled by controlling the strength of an excitation beam.

3. The optical amplifier according to claim 1, wherein the level of the optical output of the amplifier is controlled so that each of the optical signals is kept at a given output level.

4. The optical amplifier according to claim 1, wherein the external reference input corresponding to the number of the optical signals is set through a switch.

5. The optical amplifier according to claim 1, wherein said channels of the input signal are demultiplexed through a filter, and the respective channels are checked to see if optical signals are present, the number of the optical signals being determined.

6. The optical amplifier according to claim 1, wherein the optical signal channels are modulated with different frequencies, respectively, and are multiplexed into the wavelength-division-multiplexed optical input signal, the input signal is converted into an electric signal, the electric signal is separated into modulation frequency components, and the modulation frequency components are checked to see if said modulation frequencies are present, to thereby determine the number of the optical signals.

7. The optical amplifier according to claim 6, wherein the modulation frequencies are selected to suppress induced Brillouin scattering in an optical fiber that transmits the wavelength-division-multiplexed optical signal.

8. An apparatus including an optical amplifier which amplifies a wavelength-division-multiplexed signal having a plurality of signal channels in respective wavelength hands, comprising:

means for providing a reference value that varies according to the number of channels conveying signals to be amplified in response to the presence of signals in then channels;

means for detecting a signal level of the wavelength-division-multiplexed signal output from the optical amplifier; and means for controlling the output level of the amplifier in dependence upon a comparison between the detected signal level and the reference value.

9. An apparatus including an optical amplifier which amplifies a wavelength-division-multiplexed signal having a plurality of signal channels in respective wavelength bands, comprising:

means for providing a reference value that varies according to the number of channels conveying signals to be amplified in response to the presence of signals in the channels;

means for detecting a signal level of the wavelength-division-multiplexed signal output from the optical amplifier; and means for controlling the output level in dependence upon a comparison between the detected signal level and the reference value such that the gain of the optical amplifier is reduced in correspondence to the number of channels conveying signals that fail.

* * * * *